United States Patent Office 3,082,076
Patented Mar. 19, 1963

3,082,076
METHOD FOR INCREASING THE AVAILABILITY OF PHOSPHORUS TO PLANTS
John B. Hemwall, Long Beach, Calif., assignor to The Dow Chemical Company, Midland, Mich., a corporation of Delaware
No Drawing. Filed Dec. 5, 1958, Ser. No. 778,322
9 Claims. (Cl. 71—27)

The present invention relates to plant agronomy and particularly relates to improving growth of plant life in soil.

Many types of earth soils are substantially useless for the growth of vegetable and plant life therein, typical of such soils being those of rocky types, shales, basalts, and limestone character. Such soils or potential soil material are present in the earth's crust in huge amounts but they have heretofore been unavailable, from a practical standpoint, for the useful and economical growth of vegetable and plant life therein.

The basic importance of soil in food production requires that attention be directed to chemical composition of soil in relation to crop needs and particularly to availability of the elements to the plants. Plants are able to utilize only a small fraction of the total quantity of any element present in soils. Although many primary minerals may be considered storehouses of plant nutrients, the release of elements is often not sufficiently rapid in the weathering process to support intensive crop production. Among the soil components essential for plant growth is phosphorus. The phosphorus is present in soil in both organic and in inorganic combinations. Although it is present preponderantly in inorganic combination, it may be found in organic combination from as little as 3 percent in some soils to as much as 75 percent in other soils. In organic combination, phosphorus occurs in phospholipids, nucleic acids, inositol phosphates, phosphoproteins, etc. In inorganic combination, the phosphorus occurs substantially completely as salts of orthophosphoric acid.

Phosphorus, to be beneficial to the plant, must be absorbed from the soil by the plant root system. The understanding of the processes taking place during the uptake of phosphorus is still incomplete but it has been observed that plant response to phosphorus is a function of the solubility of the phosphorus present and it is believed that the anionic form $H_2PO_4^-$ is the form most utilized by the plants. It has further been observed that any factor altering this solubility will alter plant growth. Phosphorus as well as other minerals in the soil are frequently "fixed," i.e., the readily soluble plant nutrients are changed to less soluble forms by reaction with inorganic or organic components of the soil with the result that the nutrients become restricted in their mobility in the soil and suffer a decrease in availability to plants. Routes whereby the nutrient elements become fixed have been postulated as chemical or physical adsorption and double decomposition. It is generally accepted that more than one route is involved in the fixation process. It is desirable in the practice of agronomy that a method may be found to make the "fixed" phosphorus more available for plant nutrition. Furthermore, it is desirable to prevent or slow down this fixation of phosphorus and to maintain the phosphorus in a form available to plants.

It has been found, according to the present invention, that by the addition of small quantities of an ortho-diphenol compound to growth medium plants are benefited, this benefit manifesting itself in more rapid growth, earlier maturity, healthier plants, and greater yields. It has also been found that by the addition of an ortho-diphenol compound, the growth of cultivated plant life is enhanced or stimulated and that phosphorus is made available and maintained available in a form assimilable by plant life. It has further been found that by the practice of the present invention, the phosphorus uptake from soil by plants is enhanced. Furthermore, it has been found that by the incorporation of the ortho-diphenol compound that the phosphorus made available to the plant is greater than the effect obtained by doubling the amount of phosphate fertilizer added to the soil.

The ortho-diphenol compounds suitable for the practice of this invention may be represented by the structure

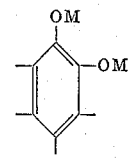

wherein the free valences are satisfied by a radical selected from the group consisting of —H, —Cl, —Br, —OM, —$NO_2$, —$NH_2$ and —$SO_3M$ wherein each M is independently selected from the group consisting of hydrogen, alkali metal, alkaline earth metal, ammonium or substituted ammonium. By "substituted ammonium" is meant primary, secondary, tertiary and quaternary alkyl ammonium radicals wherein the alkyl radical contains from 1 to 4 carbon atoms, inclusive.

Particularly useful because of the high degree of benefiting plants are the ortho-diphenol compounds which have at least one sulfonic acid substituent and which may be represented by the structure

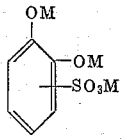

wherein the remaining positions on the nucleus are satisfied by a radical selected from the group consisting of —H, —Cl, —OM and —$SO_3M$ wherein M is as hereinbefore defined. Representative o-diphenol compounds include disodium 4,5-dihydroxy-m-benzenedisulfonate, disodium 3,6-dichloro-4,5-dihydroxy-o-benzenedisulfonate, potassium 2,3,4-trihydroxybenzenesulfonate, trisodium 4-chloro-5,6-dihydroxy-1,2,3-benzenetrisulfonate and barium 3,4-dihydroxybenzenesulfonate.

These ortho-diphenol compounds are solids. They may be applied to growth medium in any suitable form and by any means usually employed for administration of organic chemicals to growth medium. By the expression "growth medium" is meant any medium suitable for the planting and growing of vegetable and plant life. Thus, the experssion is meant to encompass not only soil but also sand, nutrient medium and "synthetic soil" composition such as sponge rock, peat, etc., and materials sold under trade names such as "Black Magic." However, the invention primarily is concerned with the application of ortho-diphenol compounds to natural soil. Included in the expression "natural soil" is a range of soil compositions which contain predominantly mineral matter to that soil which is relatively high in organic matter. In the practice of this invention, the ortho-diphenol compound may be added to acid or alkaline soil, to highly calcareous soil or soil containing as much as from 50 to 80 percent organic matter. It is suitable for use in both sandy soil and in heavy clay soil.

In carrying out the operation in accordance with the present invention, the ortho-diphenol compound is distributed in plant growth media. It may be distributed in an unmodified form but is preferably intimately dispersed in a carrier with or without the inclusion of other additaments. By "carrier" is meant any solid or liquid agent with which the ortho-diphenol compound may be employed. Thus, the carrier may be water, aqueous dispersions, organic liquid carriers, solid fertilizers, an aqueous fertilizer composition or inert dust. Administration to the soil of the ortho-diphenol compound as a constituent of phosphate containing fertilizer compositions constitutes a preferred embodiment of the present invention.

In applications to soil, good results are obtained when the ortho-diphenol compound is supplied in an amount of from 0.25 to 250 parts or more per million parts by weight of the growth medium. In applications to soil, good results are obtained when the ortho-diphenol compound is distributed at a rate of from 1 to 20 pounds or more per acre and through such cross-section of the soil as to provide for the presence therein of an effective concentration of the ortho-diphenol compound. The required amounts of ortho-diphenol compound may be supplied in from 1 to 100 gallons of organic solvent carrier, in from 1 to 27,000 or more gallons of aqueous carrier, or in from about 20 to 2,000 pounds or more of solid carrier per acre treated. When an organic solvent carrier is employed, it may be further dispersed in above volume of aqueous liquid carrier.

The exact concentration of ortho-diphenol compound to be employed in compositions for the treatment of growth media is not critical, provided that a minimum effective dosage is supplied in the media. The concentration of the ortho-diphenol compound may vary from 0.01 percent by weight to 95 percent by weight of the composition, depending on whether the composition is a treating composition or a concentrate composition and whether it is in the form of a solid or a liquid.

Liquid concentrate compositions commonly contain from 2 to 50 percent or more by weight of the ortho-diphenol compound. These concentrate compositions are generally aqueous compositions although other solvents such as acetone, diisobutyl ketone, isopropyl alcohol, and petroleum distillates may be employed as liquid carrier. Such concentrate compositions preferably contain fertilizer and may contain dispersing agents, emulsifying agents such as condensation products of alkylene oxides of phenols and organic acids, alkyl aryl sulfonates, polyoxyalkylene derivatives of sorbitan esters, complex ether alcohols, mahogany soaps and the like. Liquid concentrate compositions may be diluted to prepare treating compositions. Liquid treating compositions preferably contain from 0.01 to 10 percent by weight of the ortho-diphenol compound.

Solid concentrate compositions commonly contain from 1 to 20 percent of the ortho-diphenol compound. In such compositions, the ortho-diphenol compound may be intimately dispersed with fertilizer or inert solid material such as solid surface-active dispersing agents, chalk, talc, pyrophyllite, attapulgite, fuller's earth, or bentonite. Such concentrate compositions may be further dispersed in fertilizer or other innocuous adjuvants to obtain treating compositions. When a fertilizer is used as carrier, the fertilizer may be organic or inorganic. Suitable fertilizers include phosphate containing fertilizers such as superphosphate fertilizers, mixed nitrogen-phosphorus-potassium fertilizers, ammonium nitrate and organic fertilizers.

Solid treating compositions preferably contain from 0.1 to 25 percent by weight of the ortho-diphenol compound. Furthermore, the solid concentrate compositions may be dispersed in water with or without added dispersing agent or agents to prepare aqueous soil treating compositions as previously described.

The preferred embodiment of the present invention comprises distributing the ortho-diphenol compound in a phosphate containing fertilizer composition. Such compositions may contain the ortho-diphenol compound in from 0.5 to 20 percent by weight based on the weight of phosphorus in the fertilizer when the latter is calculated as phosphorus pentoxide.

In carrying out the operations in accordance with the present invention, an ortho-diphenol compound or a composition containing an ortho-diphenol compound is distributed in any suitable fashion in soil or other growth media, such as by simply mixing with growth media, by applying as a band beneath the seed row, by applying to the surface of the soil and thereafter dragging or discing into the soil to the desired depth, or by employing a liquid carrier to accomplish the penetration and impregnation. The application of the spray and dust compositions may be carried out by conventional methods, e.g. with power sprayers or dusters, boom and hand sprayers, etc. Further, the distribution may be accomplished by introducing the ortho-diphenol compound into the water employed to irrigate the soil. If desired, the unmodified material may be employed, but generally a liquid or solid carrier composition containing the ortho-diphenol compound is applied to the growth medium.

The following examples illustrate the invention but are not to be construed as limiting.

EXAMPLE 1

An aqueous treating composition containing labeled phosphoric acid was prepared by intimately mixing 45 parts by weight of disodium 4,5-dihydroxy-m-benzenedisulfonate as the ortho-diphenol compound, 510 parts by weight of labeled phosphoric acid ($H_3P^{32}O_4$), 322 parts by weight of ammonium nitrate and 60,000 parts by weight of water.

A similar treating composition was prepared in which disodium 4,5-dihydroxy-m-benzenedisulfonate was replaced by an equal amount by weight of the trisodium 4-chloro-5,6-dihydroxy-1,2,3-benzenetrisulfonate.

Six 10 milliliter aliquots of each of the compositions thus prepared were applied as a drench to pots containing 150 grams of soil and having three tomato plants of about 2 inches in height growing therein. After treatment, the soil contained the following concentration of materials on a dry weight basis.

| Material: | Parts by weight per million parts by weight of soil |
|---|---|
| Ortho-diphenol compound | 50 |
| Labeled phosphoric acid ($H_3P^{32}O_4$), calculated as $P_2O_5$ | 375 |
| Ammonium nitrate, calculated as nitrogen | 125 |

A check treatment was carried out in a similar manner employing a composition containing no ortho-diphenol compound.

The plants were allowed to grow for two weeks after treatment and the aerial portions then harvested. The harvested plants were then dried. The entire aerial portions of the plant were then pressed into planchets with a 2-ton press for making a count of radioactive phosphorus. From the unit weight of the sample and the total weight of harvested portions of the plant, the total uptake of radioactive phosphorus was determined, according to a method similar to that described by A. F. MacKenzie and L. A. Dean in Analytical Chemistry, 22, 489–490 (1950). From the averages of the total uptake of the radioactive phosphorus in six samples treated with the ortho-diphenol compound and the averages of the total uptake in the check determinations, the percent increase in phosphorus uptake by the plants grown on soil treated with said ortho-diphenol compound over the check plants was calculated.

The operations were carried out simultaneously employing different types of soil. The results were as follows:

*Table I*

| Ortho-diphenol compound component in composition | Soil sample | Percent increase in phosphorus uptake |
|---|---|---|
| Disodium 4,5-dihydroxy-m-benzenedisulfonate | A | 38 |
| Do | B | 28 |
| Do | C | 51 |
| Do | D | 58 |
| Do | E | 39 |
| Do | F | 22 |
| Do | G | 21 |
| Do | H | 31 |
| Do | I | 22 |
| Trisodium 4-chloro-5,6-dihydroxy-1,2,3-benzenetrisulfonate | A | 64 |
| Do | B | 34 |
| Do | C | 22 |
| Do | D | 25 |
| Do | E | 30 |
| Do | I | 30 |

A = Slightly saline, high organic matter (9.3 percent), acid (pH 5.6), loam.
B = Slightly saline, low organic matter (1.9 percent), alkaline (pH 7.7), slightly calcareous (2.3 percent calcium carbonate), sandy loam.
C = Highly saline, low organic matter (1.3 percent), alkaline (pH 7.4), non-calcareous, sandy loam.
D = Low organic matter (0.8 percent), alkaline (pH 7.7), slightly calcareous (1.5 percent calcium carbonate), sandy loam.
E = Low organic matter (0.6 percent), acid (pH 5.8), sandy loam.
F = Slightly saline, moderate organic matter (2.6 percent), alkaline (pH 7.85), moderately calcareous (6.4 percent calcium carbonate), loam.
G = Low organic matter (1.8 percent), slightly acid (pH 6.6), clay loam.
H = Moderate organic matter (4.7 percent), acid (pH 5.7), clay.
I = Moderately saline, very low organic matter (0.7 percent), alkaline (pH 7.5), non-calcareous, sandy loam.

EXAMPLE 2

In a similar manner other treating compositions were prepared in which the ortho-diphenol compound was (a) pyrogallol, (b) disodium 4,5-dihydroxy-m-benzenedisulfonate, and (c) trisodium 4-chloro-5,6-dihydroxy-1,2,3-benzenetrisulfonate. The treating compositions as well as a check composition containing no ortho-diphenol compound were applied as drench at a rate described in Example 1 to pots containing 150 grams of calcareous soil having a pH of 7.8 and in which three tomato plants were growing. The plants were allowed to grow, then harvested and determinations made on total uptake of radioactive phosphorus as previously described. The uptake of radioactive phosphorus by plants grown on soil treated with the ortho-diphenol compound were compared with the uptake in check determinations and found to be as follows.

Ortho-diphenol compound component in composition: | Percent increase in phosphorus uptake Pyrogallol ------------------------------------- 13
Disodium 4,5-dihydroxy-m-benzenedisulfonate -- 25
Trisodium 4-chloro-5,6-dihydroxy-1,2,3-benzenetrisulfonate ---------------------------------- 26

EXAMPLE 3

A modified fertilizer composition was prepared by intimately mixing 5.73 grams of commercial triple superphosphate (0–45–0) fertilizer with 0.26 gram of trisodium 4-chloro-5,6-dihydroxy-1,2,3-benzenetrisulfonate. In this and subsequent fertilizer compositions, the values in the parenthesis indicate available components as follows: (N—$P_2O_5$—$K_2O$). This corresponds to administration of 75 pounds of phosphorus pentoxide plus 7.5 pounds of the ortho-diphenol compound per acre. The above composition was uniformly distributed in a band application along the bottom of a 2½ inch deep furrow in a seed plot of highly saline, alkaline (pH 7.5), non-calcareous, sandy loam soil, low in organic matter (0.7 percent).

In simultaneous operations, 5.73 grams (corresponding to 75 pounds $P_2O_5$/acre) of unmodified commercial triple superphosphate (0–45–0) fertilizer and 11.46 grams (corresponding to 150 pounds $P_2O_5$/acre) of unmodified commercial triple superphosphate (0–45–0) fertilizer were distributed in other 2½ inch deep furrows as checks.

About 2 inches of soil was then placed in the furrows and tomato seeds were then planted therein and covered with about ½ inch of soil. The seeds were then allowed to sprout and as soon as the true leaves started to form on the tomato seedlings, they were thinned to about 24 plants per 18-inch row. About five weeks later, the plants were harvested and determinations made on the phosphorus uptake by the plants. The analysis for phosphorus was carried out chemically by digesting the harvested plant with nitric-perchloric acid mixture according to a method similar to that described on page 294 of "Soil and Plant Analysis," by C. S. Piper, Interscience Publishers, Inc., New York, 1944. The solutions resulting from the digestion were then analyzed for phosphorus employing the phosphomolybdate blue method as described by S. R. Dickman and R. H. Bray in Industrial and Engineering Chemistry, Analytical Edition, 12, 665–668 (1940).

The results of these determinations showed that the phosphorous uptake of the plants treated with a fertilizer composition modified with trisodium 4-chloro-5,6-dihydroxy-1,2,3-benzenetrisulfonate was greater than that of plants treated with twice the amount of phosphate fertilizer as can be seen from the following figures:

Percent increase in phosphorus uptake
Modified composition (75 pounds of $P_2O_5$ + 7.5 pounds of trisodium 4-chloro-5,6-dihydroxy-1,2,3-benzenetrisulfonate/acre) --------------------------- 40
Check (75 pounds of $P_2O_5$/acre) ----------------- --
Check (150 pounds of $P_2O_5$/acre) ---------------- 30

EXAMPLE 4

A modified fertilizer composition containing ortho-diphenol compound was prepared by intimately mixing trisodium 4-chloro-5,6-dihydroxy-1,2,3-benzenetrisulfonate with commercial triple superphosphate fertilizer as follows:

Parts by weight
Triple superphosphate (0–45–0) ------------------ 567
Trisodium 4-chloro-5,6-dihydroxy-1,2,3-benzenetrisulfonate ---------------------------------- 6.4

The modified fertilizer composition as well as an unmodified fertilizer check composition were applied to plots of sandy loam soil having a pH of 5.8 and of low organic content (0.6 percent) in a broadcast application by intimately admixing with the soil. The modified composition was administered at a rate corresponding to 100 pounds of phosphorus pentoxide plus 2.5 pounds of the ortho-diphenol compound per acre. The unmodified fertilizer check composition was administered at a rate corresponding to 100 pounds of phosphorus pentoxide per acre. After treatment of the soil, the plots were planted with tomato seeds. After five weeks, the plants were harvested and a determination made of the phosporus content, employing the digestion and phosphomolybdate blue method described in Example 3. From the average phosphorus content of the plants grown on soil treated with the composition containing the ortho-diphenol compound and the phosphorus content of the plants in the check determination, the percent increase of phosphorus uptake in the plants grown on treated soil to untreated check plants were calculated. The value was found to be 21 percent.

EXAMPLE 5

Modified fertilizer compositions containing two concentrations of ortho-diphenol compound were prepared by mixing trisodium 4-chloro-5,6-dihydroxy-1,2,3-benzenetrisulfonate with commercial triple superphosphate fertilizer as follows.

Composition A:  Parts by weight
   Triple superphosphate (0-45-0) _____ 1032
   Trisodium 4 - chloro - 5,6-dihydroxy-1,2,3-benzenetrisulfonate _____ 11.6

Composition B:
   Triple superphosphate (0-45-0) _____ 1032
   Trisodium 4 - chloro - 5,6-dihydroxy-1,2,3-benzenetrisulfonate _____ 23.2

These modified fertilizer compositions were applied uniformly in band application along the bottom of a 2½ inch deep furrow in a seed plot of acid (pH 5.8), sandy loam soil, low in organic matter (0.6 percent). Composition A was administered at a rate corresponding to 100 pounds of phosphorus pentoxide plus 2.5 pounds of the ortho-diphenol compound per acre; and Composition B was administered at a rate corresponding to 100 pounds of phosphorus pentoxide plus 5.0 pounds of the ortho-diphenol compound per acre.

In a simultaneous operation, 10.32 grams (corresponding to 100 pounds of phosphorus pentoxide per acre) of unmodified commercial triple superphosphate (0-45-0) was distributed in another 2½ inch deep furrow as a check.

About 2 inches of soil was then placed in the furrows and tomato seeds were planted therein and covered with about ½ inch of soil. The seeds were allowed to sprout and as soon as the true leaves started to form on the tomato seedlings, they were thinned to about 24 plants per 16-inch row. About five weeks later, the plants were harvested and weighed and determinations made on the phosphorus uptake by plants according to the method described in Example 3. The results were as follows:

| Composition | Rate of orthodiphenol compound in lbs./acre | Wet weight in grams/9 plants | Percent increase in phosphorus uptake |
|---|---|---|---|
| A | 2.5 | 18.1 | 83 |
| B | 5.0 | 19.2 | 90 |
| Check | 0 | 7.5 |  |

EXAMPLE 6

Modified fertilizer compositions containing various ortho-diphenol compounds are prepared as follows:

Composition I:  Parts by weight
   Triple superphosphate (0-45-0) _____ 2222
   4-chloro-1,2-dihydroxy-5-nitrobenzene _____ 100

Composition II:
   Triple superphosphate (0-45-0) _____ 2222
   1,2-dihydroxy-4-nitrobenzene _____ 100

Composition III:
   Triple superphosphate (0-45-0) _____ 2222
   Hydroxyhydroquinone _____ 100

Composition IV:
   Triple superphosphate (0-45-0) _____ 2222
   4-aminocatechol _____ 100

Composition V:
   Superphosphate (0-19-0) _____ 5270
   Di(tetramethylammonium) 4,5 - dihydroxy-m-benzenedisulfonate _____ 100

Composition VI:
   "Ammo-phos fertilizer" (16-20-0) _____ 5000
   4-bromopyrogallol _____ 100

Composition VII:
   "10-10-10 fertilizer" (10-10-10) _____ 10,000
   Tris(isopropylammonium) 4 - chloro-5,6-dihydroxy-1,2,3-benzenetrisulfonate _____ 100

Composition VIII:
   "10-10-10 fertilizer" (10-10-10) _____ 10,000
   Diammonium 4,5 - dihydroxy-m-benzenedisulfonate _____ 100

These composition are uniformly distributed in separate operations in band applications at a rate corresponding to 75 pounds of phosphorus pentoxide plus 7.5 pounds of ortho-diphenol compound per acre and thereafter planted with tomato seeds. Check operations are simultaneously carried out by applying (a) the same amount of fertilizer, and (b) double the amount of fertilizer but in each case omitting the ortho-diphenol compound. After about six weeks the plants are harvested and determined for phosphorus uptake by chemical analysis. The results show that all of the plants grown on soil treated with modified fertilizer compositions have a phosphorus uptake equal to or greater than that obtained by doubling the amount of fertilizer.

EXAMPLE 7

The effectiveness of ortho-diphenol compounds in reducing phosphorus fixation in soil was determined as follows: A 100 milliliter aqueous dispersion containing 1 gram of sodium kaolinite clay, 2 millimoles of potassium acid phosphate ($KH_2PO_4$) and varying amounts of ortho-diphenol compound was allowed to stand for two weeks. Thereafter, the mixture was centrifuged and an analysis made for phosphorus according to the method described in Example 3. The amount of phosphorus remaining was compared with a check dispersion containing no ortho-diphenol compound. The results expressed as percent reduction in phosphorus (P) fixation were calculated as follows:

Percent reduction
$$= 100 \frac{(\text{P fixed in check soln.} - \text{P fixed in test soln.})}{(\text{P fixed in check soln.})}$$

The result is an index of increased availability of phosphorus, i.e., the greater the reduction of fixation, the greater the amount of available phosphorus. The results are given in the following table.

| Compound | Milligrams orthodiphenol compound/100 milliliters | Percent increase in availability of phosphorus |
|---|---|---|
| Potassium 2,3,4-trihydroxybenzenesulfonate | 14.6 | 52 |
| Barium 3,4-dihydroxybenzenesulfonate | 31.0 | 46 |

EXAMPLE 8

An aqueous treating composition was prepared having the following composition:

Component:  Parts by weight per million parts by weight of soil
   Disodium 4,5 - dihydroxy-m-benzenedisulfonate _____ 750
   Ammonium nitrate _____ 5400
   85 percent phosphoric acid (sp. gr., 1.7) ____ 8500

The composition was applied as drench to pots containing tomato plants growing in 150 grams of soil in an amount sufficient to supply the concentration of materials on a dry weight basis:

Component:  Parts by weight per million parts by weight of soil
   Disodium 4,5-dihydroxy-m-benzenedisulfonate_ 50
   Ammonium nitrate (calculated as nitrogen) __ 125
   Phosphoric acid (calculated as $P_2O_5$) _____ 375

For check treatment, similar pots containing tomato plants were fertilized at a rate of 75 pounds of phosphorus pentoxide (equal to 375 parts by weight of $P_2O_5$ per million parts by weight of soil), and at a rate of 150 pounds of phosphorus pentoxide per acre (equal to 750 parts by weight of P₂O₅ per million parts by weight of soil).

The plants were allowed to grow for two weeks after treatment and the aerial portions of the plants were harvested, dried and the dried weights compared with the check determination wherein other tomato plants were grown on soil fertilized at a rate of 75 pounds of phosphorus pentoxide per acre. The results were as follows:

|  | Percent increase in dry weight of plant |
|---|---|
| (A) Modified composition (75 pounds of P₂O₅ per acre+7.5 pounds of ortho-diphenol compound) | 21 |
| (B) Check (75 pounds of P₂O₅ per acre) | -- |
| (C) Check (150 pounds of P₂O₅ per acre) | 17 |

I claim:
1. In the fertilization of soil with a phosphate fertilizer, the step which comprises administering to soil substantially simultaneously with the phosphate fertilizer an ortho-diphenol compound having the formula

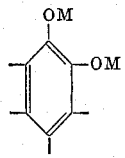

wherein the free valences are satisfied by a radical selected from the group consisting of —H, —Cl, —Br, —OM, —NO₂, —NH₂ and —SO₃M, and wherein each M is independently selected from the group consisting of hydrogen, alkali metal, alkaline earth metal, ammonium and lower alkyl substituted ammonium, said lower alkyl containing from 1 to 4 carbon atoms, inclusive; and wherein said ortho-diphenol compound is supplied in amounts sufficient to provide for the presence thereof of from about 0.25 to about 250 parts by weight per million parts by weight of soil.

2. A fertilizer composition comprising a phosphate fertilizer as source of phosphate ions and an ortho-diphenol compound having the formula

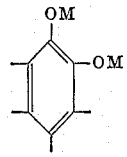

wherein the free valences are satisfied by a radical selected from the group consisting of —H, —Cl, —Br, —OM, —NO₂, —NH₂ and —SO₃M, and wherein each M is independently selected from the group consisting of hydrogen, alkali metal, alkaline earth metal, ammonium and lower alkyl substituted ammonium, said lower alkyl containing from 1 to 4 carbon atoms, inclusive; and wherein in said phosphate containing fertilizer composition, the ortho-diphenol compound is present in amounts of from about 0.5 to 20 percent by weight based on the weight of the phophorus in the fertilizer when the latter is calculated as phosphorus pentoxide.

3. A method for enhancing phosphorus uptake by plants from soil, said soil containing difficultly available phosphorus, and promoting plant growth therein, which comprises dispersing through said soil an ortho-diphenol compound having the formula

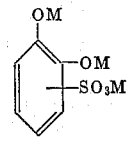

wherein the remaining positions on the nucleus are satisfied by a radical selected from the group consisting of —H, —Cl, —OM and —SO₃M, wherein each M is independently selected from the group consisting of hydrogen, alkali metal, alkaline earth metal, ammonium and lower alkyl substituted ammonium, said lower alkyl containing from 1 to 4 carbon atoms, inclusive; and wherein said ortho-diphenol compound is administered in amounts to provide for the presence thereof of from about 0.25 to about 250 parts by weight per million parts by weight of soil.

4. A method for increasing availability of phosphorus in soil to plants, said soil containing difficultly available phosphorus, which comprises dispersing through said soil disodium 4,5-dihydroxy-m-benzenedisulfonate, wherein said disodium 4,5-dihydroxy-m-benzenedisulfonate is administered in amounts to provide for the presence thereof of from about 0.25 to about 250 parts by weight per million parts by weight of soil.

5. A method for increasing availability of phosphorus in soil to plants, said soil containing difficultly available phosphorus, which comprises dispersing through said soil disodium 3,6-dichloro-4,5-dihydroxy-o-benzenedisulfonate, wherein said disodium 3,6-dichloro-4,5-dihydroxy-o-benzenedisulfonate is administered in amounts to provide for the presence thereof of from about 0.25 to about 250 parts by weight per million parts by weight of soil.

6. A method for increasing availability of phosphorus in soil to plants, said soil containing difficultly available phosphorus, which comprises dispersing through said soil potassium 2,3,4-trihydroxybenzenesulfonate, wherein said potassium 2,3,4-trihydroxybenzenesulfonate is administered in amounts to provide for the presence thereof of from about 0.25 to about 250 parts by weight per million parts by weight of soil.

7. A method for increasing availability of phosphorus in soil to plants, said soil containing difficultly available phosphorus, which comprises dispersing through said soil trisodium 4-chloro-5,6-dihydroxy-1,2,3-benzenetrisulfonate, wherein said trisodium 4-chloro-5,6-dihydroxy-1,2,3-benzenetrisulfonate is administered in amounts to provide for the presence thereof of from about 0.25 to about 250 parts by weight per million parts by weight of soil.

8. A method for increasing availability of phosphorus in soil to plants, said soil containing difficultly available phosphorus, which comprises dispersing through said soil barium 3,4-dihydroxybenzenesulfonate, wherein said barium 3,4-dihydroxybenzenesulfonate is administered in amounts to provide for the presence thereof of from about 0.25 to about 250 parts by weight per million parts by weight of soil.

9. A method for treating soil containing difficultly available phosphorus to increase the uptake therefrom by plants of said phosphorus which comprises introducing into soil a composition comprising a phosphate fertilizer composition in intimate admixture with an ortho-diphenol compound having the formula

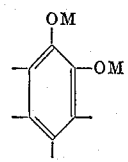

wherein the free valences are satisfied by a radical selected from the group consisting of —H, —Cl, —Br, —OM, —NO₂, —NH₂ and SO₃M, and wherein each M is independently selected from the group consisting of hydrogen, alkali metal, alkaline earth metal, ammonium and lower alkyl substituted ammonium, said lower alkyl containing from 1 to 4 carbon atoms, inclusive; and wherein said composition is administered in amounts sufficient to provide for the presence in soil of at least 0.25 part by weight of said ortho-diphenol compound per million parts by weight of soil.

References Cited in the file of this patent

UNITED STATES PATENTS

| | | |
|---|---|---|
| 2,222,736 | Bancroft et al. | Nov. 26, 1940 |
| 2,222,738 | Bancroft et al. | Nov. 26, 1940 |

OTHER REFERENCES

Ohyama et al.: "Chemical Abstracts," vol. 47, page 7153, 1953.

Flaig et al.: "Chemical Abstracts," vol. 46, page 1620, 1952.

Otto: "Chemical Abstracts," vol. 47, page 5495, 1953.